March 22, 1966     H. W. GABAR     3,242,342
MEANS FOR LOCATING THE CENTER OF A MOVING ARTICLE
Filed Feb. 24, 1964     3 Sheets-Sheet 2
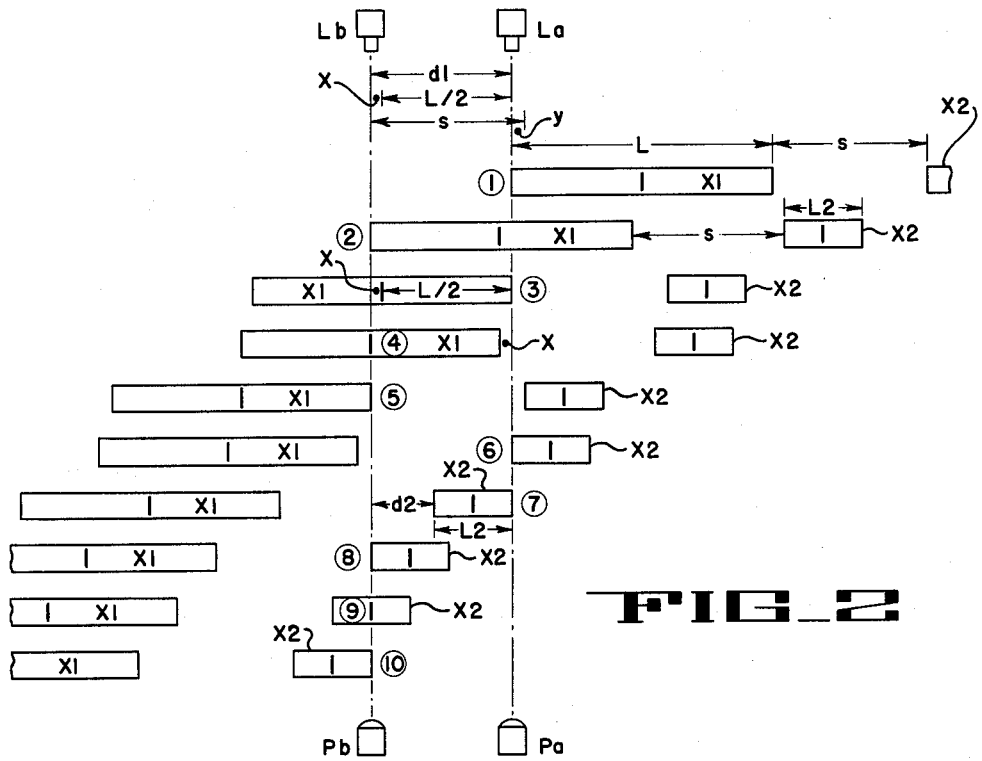
FIG_2
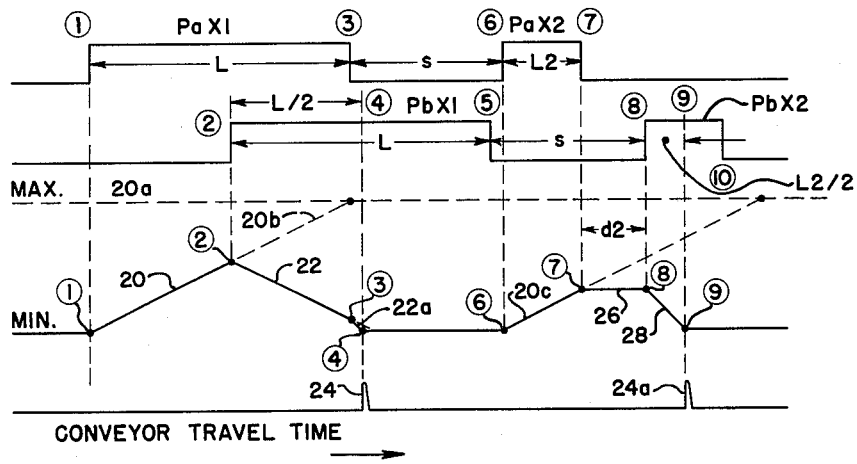
FIG_3
INVENTOR
HARRY W. GABAR
BY *Hans G. Hoffmeister*
ATTORNEY

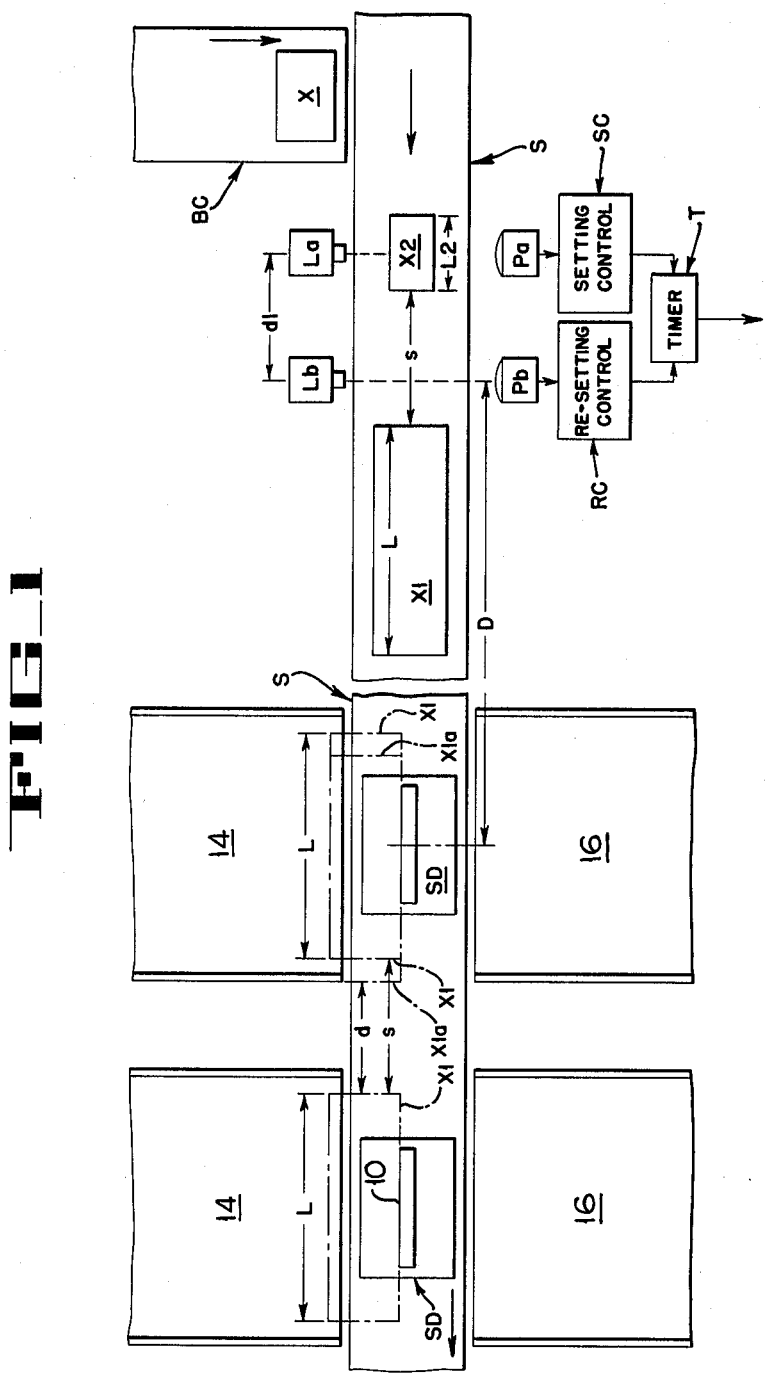

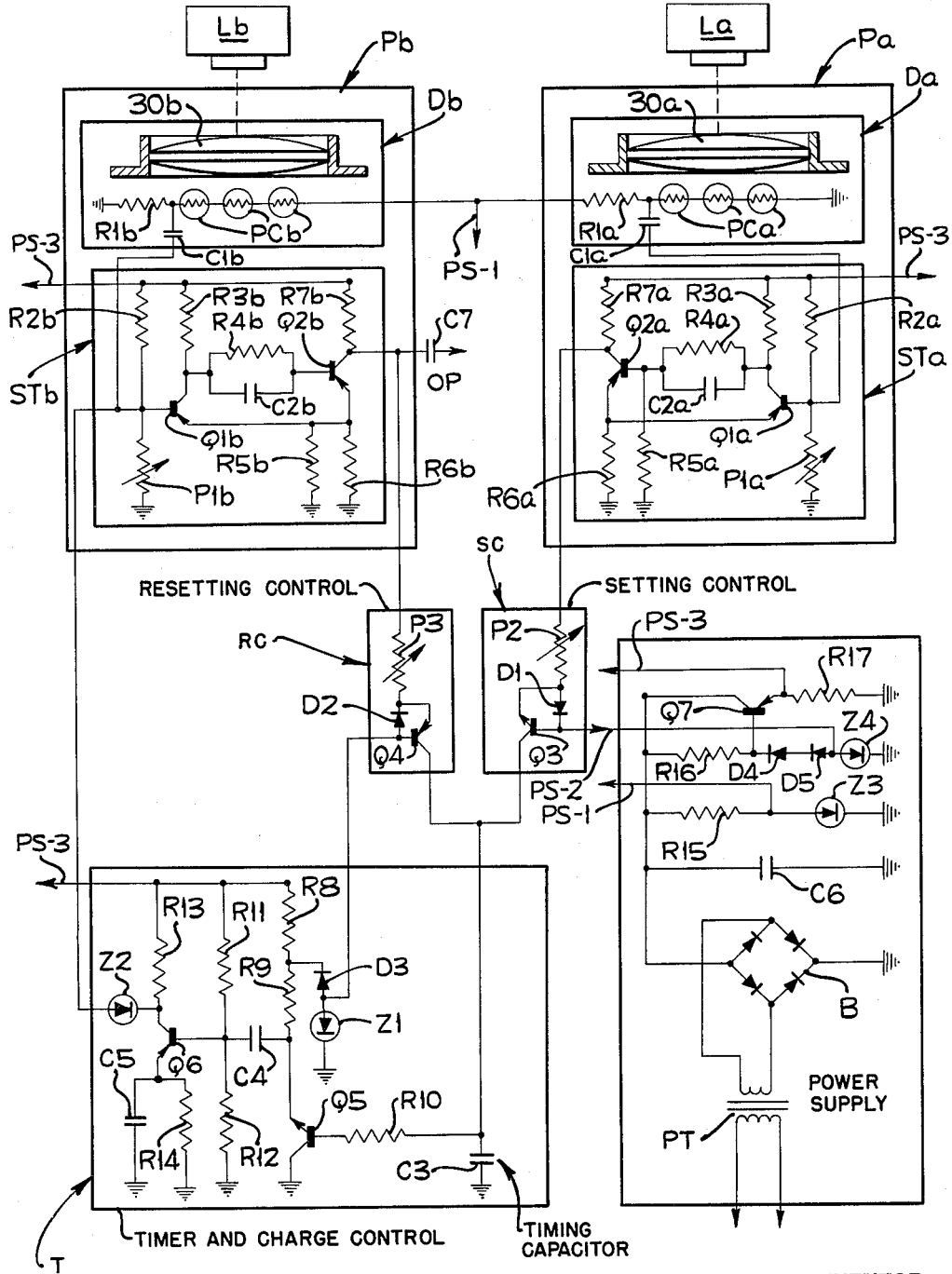
FIG_4

United States Patent Office 3,242,342
Patented Mar. 22, 1966

3,242,342
MEANS FOR LOCATING THE CENTER OF A MOVING ARTICLE
Harry W. Gabar, San Mateo, Calif., assignor to FMC Corporation, San Jose, Calif., a corporation of Delaware
Filed Feb. 24, 1964, Ser. No. 346,710
16 Claims. (Cl. 250—223)

The present invention relates to the article handling art, and more particularly, this invention relates to a method and apparatus for locating the center of articles moving on a conveyor, so that subsequent diversion of each article from the conveyor may be precisely timed in accordance with the position of the transverse center line of the article.

An object of this invention is to provide means whereby the center of a moving article can be accurately located.

Another object of this invention is to provide a method of locating the center of a moving article from information gathered relative to the passing of the ends of the article relative to spaced reference lines.

Another object is to provide a simple and effective apparatus which will generate a signal when the center of an article carried by a conveyor passes a given point.

Another object of this invention is to provide an article conveying system wherein selected articles are accurately diverted by pusher blades from a conveyor, with the articles centered relative to the blades.

Another object is to provide a center locating apparatus which can locate the centers of small parcels travelling at a high speed on a conveyor.

A further object is to avoid the use of dual circuitry in an electronic timer controlled by position photosensors. In the present invention, a single timer circuit is controlled by two photosensors.

These and other objects and advantages of the present invention will become apparent from the following detailed description of the invention, made with reference to the accompanying drawings wherein:

FIG. 1 is a schematic plan of part of a conveyor system to which the center locator of this invention has been applied, the elements of the center locator being shown schematically.

FIGURE 2 is a series of views showing the positions of a long and a short parcel at critical states in the operation.

FIGURE 3 is a graphical representation of the operation of the center locator illustrated in FIGURE 1, which is keyed to the various article positions shown in FIGURE 2.

FIGURE 4 is a detailed circuit diagram of a circuit for use as a parcel center locator, in accordance with the present invention.

An example of a parcel sorting system in which the parcel center locator of the present invention would be used is provided in the copending patent application of Collins, et al., Serial No. 190,889, filed April 30, 1962, and assigned to the assignee of the present application, and concerning a novel article sorting system suitable for use in the sorting of post office parcels. In this parcel sorting system, parcels are diverted onto one of a series of buffer or temporary storage conveyors from any one of a plurality of primary conveyors. The parcels are individually transferred from the buffer conveyor to a secondary conveyor, and are then diverted from the secondary conveyor by a preselected secondary diverter, forming one of a series of secondary diverters arranged along the secondary conveyor. A parcel center locator of the present invention is disposed along the secondary conveyor adjacent to, but downstream from each buffer conveyor.

For reasons evident from the aforesaid copending application, pusher-type secondary diverters are the most desirable type, and these diverters must operate with precision, so that only the designated parcel is diverted, and so that each parcel is diverted accurately. These conditions are achieved by the use of the parcel center locator of the present invention, herein described, which insures that each secondary diverter will operate when a parcel is centered with respect thereto.

Referring to FIGURE 1 of the accompanying drawings, it will be assumed for the purpose of illustration that parcels X, X1, X2, etc., of various sizes are directed into a buffer conveyor BC from a primary conveyor (not shown), are released from the buffer conveyor BC onto a secondary belt conveyer S, and proceed in the direction indicated by the arrow toward one or more secondary diverters SD. The secondary conveyor S is driven by conventional means, such as a belt pulley and a motor, not shown. Each diverter SD has a blade 10 that descends from its normal position above the conveyor S and moves to one side, to deflect a parcel, such as that indicated at X1 or X2, into a chute 14 or 16. The diverter SD can be selectively operated to deflect a parcel off either side of the secondary conveyor S. Such a diverter has been described in the aforesaid copending application, and the diverter is remotely controllable by a signal from a memory device which gives a diverting signal when the center of the parcel to be diverted is opposite the diverter. The apparatus of the present invention gives a parcel center signal to the memory device, and the latter stores the signal (in effect) until the parcel is centered at a selected diverter, whereupon the diverting signal is given.

The maximum utilization of the useful length of the secondary conveyor S would occur if the parcels were placed end to end. This condition cannot be obtained, because the secondary diverters SD must be equally spaced along the delivery section of the conveyor by a distance sufficient to permit them to complete their cycle without striking an adjacent parcel. Also, the diverters must be spaced by a distance that is long enough to handle the theoretical condition that would arise in case all parcels were of maximum length. Stated differently, if two successive maximum length parcels X1 and X1a (shown in broken lines in FIG. 1) were on the secondary conveyor, adjacent ends of these parcels must be spaced by a dead time distance "d" that equals the conveyor travel during a diverter cycle, to insure that the trailing parcel X1a strikes neither the diverter, nor the trailing edge of the leading parcel X1. In this case the parcel is longer than the diverter blade, so that the center to center spacing of these long parcels would be the dead time distance "d" plus the parcel length.

With parcels that are shorter than the diverter blade, there can be no interference between parcels during diversion, but only between the training parcel and the diverter blade. Assuming all parcels to be centered on the diverter blade during diversion, in the latter case the center to center spacing of the parcels would be equal half the length of the diverter blade plus the dead time travel distance "d."

Thus, a theoretically practical minimum end to end parcel spacing is attainable if the secondary diverters SD are controlled by measurement of the center to center distances of random length parcels deposited on the secondary conveyor S, but as indicated above, this theoretical minimum spacing varies with parcel length, and so requires the measurement of center to center parcel distances. This makes possible the use of a relatively short diverter blade 10, which will provide accurate diverter operation that is initiated so that the blade centrally strikes each parcel to be diverted. Such a blade also wears equally, and since it is parcel center controlled, will divert the parcels without turning them.

The principal components of the center locator apparatus are shown in a general diagrammatic form in FIGURE 1, from which figure it will be noted that a parcel such as parcel X1 shown in solid lines and travelling along the conveyor S, will first break the light beam from a light $La$ to the photosensor $Pa$, and will next break the beam from a light $Lb$, to a photosensor $Pb$. The distance "$d1$" between photosensors $Pa$ and $Pb$ is set to be slightly more than half the length "L" of the longest parcel (X1) that can be handled by the system by a small distance "$x$," but the distance "$d1$" is slightly less than the minimum parcel spacing indicated at "$s$," by a small safety factor "$y$." Thus, for long parcels, there is a time when both light beams will be broken, but for short parcels the first beam from lamp $La$ will be broken and restored, before the second beam from lamp $Lb$ is broken by the same parcel.

Insofar as the function of locating the center of a single parcel is concerned, the only requirement as to the spacing "$d1$" of $Pa$ and $Pb$, is that it slightly exceeds half of the length of the longest parcel, namely $L/2$. However, if the optimum number of parcels is to be handled on a given conveyor, the spacing "$d1$" of $Pa$ and $Pb$, will not substantially exceed the minimum designated spacing between parcels (the distance "$d$" referred to relative to FIGURE 1, plus the small safety factor "$x$" previously mentioned), in order to preclude the photosensor $Pa$ from adding a length measurement of a trailing parcel to that of the parcel that has preceded it and is being sensed by the photosensor $Pb$. This condition would throw off the center measurement of the leading parcel. In operation, the minimum end to end spacing "$s$" is maintained by the timing of the buffer conveyor BC, for a given linear speed of the secondary conveyor S.

As soon as the light beam from $La$ is broken by the leading end of parcel X1, a signal is sent by photosensor $Pa$ to a Setting Control SC, which initiates the setting or "winding" of a timer T. This operation, which measures parcel length, continues until the trailing edge of the parcel has passed $La$, with which the light beam of $Pa$ has been restored. However, as soon as the beam from $Lb$ to photosensor $Pb$ is broken by the leading edge of the same parcel, a signal is sent by $Pb$ to a Resetting Control RC, which initiates a countdown period by the timer. The countdown rate from the Resetting Control RC is compared with a rate representing parcel length, as introduced to the timer T by the Setting Control SC, but in accordance with the invention the countdown rate proceeds at twice the setting rate. Thus the timer T will return to its "unwound" state when the center of the parcel reaches the line between $Lb$ and $Pb$. An output signal or pulse is generated by the timer when it returns to its normal or "unwound" state, and this signal is received by a diverter control circuit (not shown), which effects the operation of the secondary diverters $Sd$, at a time dependent upon the occurence of the timer signal.

As mentioned, the actual diversion signal is supplied from a memory device that keeps track of the parcel and introduces a time delay that represents the travel of the center of the parcel from the reference line $Lb$–$Pb$ (or from an adjacent reference line), to the center of a diverter blade 10, which distance is shown as "D" in FIGURE 1. Since the memory device need only receive a signal from the timer T that represents the exact location of the center of the parcel on the conveyor at a given time, and since the memory device in effect stores the parcel center signal and merely supplies a time delay representing the conveyor travel D independently, the details and nature of the memory device form no part of the present invention. A system of this type, suitable for use with the present invention is described in detail in the aforesaid Collins, et al. application. All that is required of the present invention is that it supply a signal, as the center of each random length parcel passes the reference line $Lb$–$Pb$.

A step by step explanation of the operation of the center locator may be given with reference to FIGURES 2 and 3, which show graphically the operation of the photosensors $Pa$ and $Pb$ and the timer T, as two parcels X1 and X2 pass both photosensors $Pa$ and $Pb$. Parcel X1 has a length "L" which represents the longest acceptable parcel length, whereas parcel X2 has a length "L2" that is shorter than the length of the diverter blades 10. It is assumed for discussion that each photosensor $Pa$ or $Pb$ is turned "on," or energized when the light to it is blocked, and that the corresponding Setting or Resetting control circuit is energized when the photosensor is "on." The energization state of each photosensor may be represented by the long pulses $PaX1$, $PaX2$ and $PbX1$, $PbX2$. These pulses have a duration corresponding exactly to the length of the parcels X1 and X2, and are spaced in time by a duration "$s$" corresponding to the physical end to end spacing "$s$" of the parcels as indicated in FIGURE 1.

When the leading end of parcel X1 occludes the beam of $La$ (point 1) this starts pulse $PaX1$. The timer T now begins to be set or "wound" at a uniform rate, so that the countup time interval, or timer period, is uniformly increased. This countup rate is indicated by a rising line 20 in FIG. 3, which has its origin at the start of pulse $PaX1$ (point 1), and which would reach a maximum value 20a (as indicated by a dashed line 20b) if nothing more were done. The maximum value 20a is determined by the length of the longest parcel (X1, say) that the system can handle. The maximum value 20a is theoretical in practice, but it would be actually reached in the case of a maximum length parcel, if the effect of the photosensor $Pb$ and that of the Re-setting Control RC, were not superimposed on the effect of photosensor $Pa$ and the Setting Control SC.

However, with the present situation, as soon as the leading end of parcel X1 occludes $Lb$ (point 2), pulse $PbX1$ commences and the timer T starts to be reset, or "unwinds." As previously noted, the timer is caused to reset at twice the rate at which is being set (or "wound"). Thus, as long as the pulses $PaX1$ and $PbX1$ overlap that is, so long as both $La$ and $Lb$ are occluded by parcel X1 the timer is being both set and reset. Since the resetting rate is twice the setting rate, the timer will in fact proceed with a countdown at a rate (indicated by a downwardly sloping line 22) which has a slope numerically equal to that of the original setting rate (indicated by line 20).

Just before half of parcel X1 passes $Pb$, photosensor is again illuminated (point 3), pulse $PaX1$ ceases, and the timer ceases to be set or "wound" by the action of $Pa$ and the Setting Control SC. The reason this occurs just before half of parcel X1 passes $Pb$, is because the slight safety factor distance "$x$" between "$L/2$" and "$d1$," FIGURE 1. The net rate of countdown, caused now solely by the occlusion of $Lb$ and the Re-setting Control RC, therefore doubles the slope of the countdown line, as indicated by the short, more steeply droping line 22a of FIGURE 3.

Just as the center line of parcel X1 reaches $Pb$, (point 4), the accelerated countdown terminates, and a pulse such as 24 (FIG. 3) is generated by the timer T. It is the pulse 24 which gives an indication that the parcel is centered on a reference line, and which is sent to the memory device as described.

The pulse $PbX1$ continues until the trailing edge of parcel X1 pases $Lb$ (point 5), but this point is of no significance.

The timer is not again set or "wound" until the start of a pulse $PaX2$, caused by interruption of the beam of $La$ by the leading end of the trailing parcel X2 (point 6).

The setting rate for parcel X2 is indicated by line 20c, at the lower curve of FIG. 3, and line 20c continues only for the duration of pulse PaX2, that is, while La is occluded by parcel X2. The termination of pulse PaX2 and the setting line 20c is point 7.

For a short period following the end of pulse PaX2, the timer is left in its partially set condition (as indicated by the horizontal line 26) having a length "d2," since light now falls on both Pa and Pb photosensors. The period of time "d2" represented by the flat top 26 of the timer curve equals the spacing "d1" of the photosensors, minus the length "L2" of the short parcel X2. At the commencement of pulse PbX2 (point 8), the timer starts a countdown at a rate indicated by line 28. However, with parcel X2 the beam of La has been cleared, and remains unbroken during the entire countdown, so that the entire countdown 28 proceeds at twice the setting rate indicated by line 20c. Since the timer is not being set during the countdown period as before, and since line 28 is twice as steep as lines 20, 22 and 20c, the countdown will again terminate when parcel X2 is centered opposite Pb (point 9), and a timer output signal pulse 24a will be generated. Of course, the pulse PbX2 terminates when parcel X2 clears Lb (point 10) but since pulse 24a has been given, the timing of point 10 is of no significance.

It will be appreciated that the above description applies in general to any timer which is wound up by a setting motor and wound down at twice the winding rate by a resetting motor; to a mechanical differential timer that is turned in one direction at a given rate by a setting motor, and which accepts an input in the other direction at twice the setting rate by a re-setting motor; and to analagous electrical and pneumatic timers. Furthermore, there may be applications where instead of locating the center of an article, a signal must be generated after a portion (other than half) of the article has passed a given point. In such a case, the present invention could also be used, the only change required being an adjustment of the relative setting and resetting rates.

If it is assumed (for example) that the shortest parcel length is six inches, and that the rate of travel of conveyor S is five feet per second, then the shortest potosensor pulse (representing the length of a 6" parcel), will be $\frac{1}{10}$ of a second, and the accurate timing to at least $\frac{1}{20}$ of a second necessary to find the center of the parcel, is difficult to achieve with mechanical or electromechanical devices. A novel electronic circuit has therefore been devised, as part of the present invention, to provide timing pulses of the desired rate and accuracy. This circuit is illustrated in FIGURE 4 and has been arranged to generally correspond in layout with FIGURE 1. In addition to the basic elements shown in block form in FIGURE 1, however, FIGURE 4 indicates a Power Supply and a Timer which includes a Charge Control. The Power Supply is of conventional design and application, while the operation of the Timer will be described in detail presently.

Referring in detail to FIGURE 4, it will be seen that the photosensor units Pa and Pb are substantially identical, each comprising a light detector (Da and Db, respectively) and a Schmitt trigger (STa and STb, respectively). In order to distinguish between the components of the two photosensors Pa and Pb, the suffix "a" and the suffix "b," repsectively will be used, but, where either sensor may be referred to, the suffixes will not be used. Each detector D consists of an optical arrangement 30 adapted to direct light from the light source L onto each of three photoconductive cells PC which form, together with a series resistor R1, a potential divider between the supply voltage PS–1 and ground. It will be noted that, although resistor R1a is arranged between photoconductive cells PCa and the power supply PS1, R1b is arranged between cells PCb and ground. Thus, if (as shown) the grounded terminal of power supply is positive, the blocking of light to photocells PCa will increase the potential of the connected plate of coupling capacitor C1a, and thereby send a negative-going pulse to the Schmitt trigger STa.

On the other hand, when light is blocked to photocells PCb, the connected plate of capacitor C1b is made more negative, and a positive-going pulse is presented to a Schmitt trigger STb. The restoration of light beams from La and Lb will cause the generation of reverse polarity pulses by detectors Da and Db (respectively). Since each detector D is isolated from its Schmitt trigger ST by the coupling capacitor C1, slow changes in ambient light levels and variations in the supply voltage will not affect the operation of the Schmitt triggers.

Each Schmitt trigger circuit ST is entirely standard and, for details of the operation of such circuits, reference may be made to the Department of the Army Technical Manual No. TM–11690, page 208 (1959). Briefly, however, the potential divider formed by a resistor R2 and a potentiometer P1 biases the base of a transistor Q1 so that a positive-going pulse from condenser C1 causes the transistor Q1 to be cut off, and little current flows through the transistor collector resistor R3. In such a case, the base of the second transistor Q2 saturates, the actual base voltage depending upon the potential divider formed by resistors R3, R4 and R5. By virtue of the current flow through a common emitter resistor R6, the emitter of transistor Q1 is held at a considerable negative potential so as to reverse bias the emitter-base junction of Q1, the emitter potential being basically determined by the voltage divider formed by R6 and R7 when transistor Q2 is saturated.

If reference is made to the table of typical valves for the various components of the circuit shown in FIGURE 4, it will be noted that resistor R7 is very much larger than resistor R6, so that when transistor Q2 is saturated, the output line of the Schmitt trigger ST is very nearly at ground potential; while when transistor Q2 is cut off, the output line assumes a potential close to that of the power supply line PS–3. From the foregoing description it will be seen that transistor Q2a will be cut off and transistor Q2b saturated when light to the photocells PCa and PCb is blocked, because the detector Da generates a negative pulse and the detector Db generates a positive pulse.

Referring now to the portion of FIGURE 4 which illustrates the Setting Control, the Resetting Control, and the Timer and Charge Control circuits, it will be noted that the timing element simply consists of a single timing capacitor C3, which is charged at a given rate by the Setting Control circuit, and discharged at twice that rate by the Resetting Control circuit. In order to maintain the charging and discharging of the timer capacitor C3 substantially linear with respect to time, the Setting Control consists of a constant current charging circuit, while the Resetting Control consists of a constant current discharge circuit, and a minimum charge control function ensures that the timer capacitor always has a given minimum charge and operates on the more linear portion of its charge-time curve.

Transistors Q3 (NPN) and Q4 (PNP) of the charging and discharging circuits, respectively, are arranged in common base connection, with their collectors connected to the timer capacitor C3. The base of transistor Q3 is held at a substantially higher (less negative) potential by the Timer and Charge Control circuit.

When the light falls on photocells PCa, transistor Q2a of the Schmitt trigger STa is saturated, and the input terminal of potentiometer P2 of the Setting Control charging circuit is therefore only a few volts negative. Current will therefore flow in diode D1 to the more negative power supply line PS–2, and the voltage drop thereover will prevent excessive reverse base-emitter bias on transistor Q3.

However, when the light to photocells PCa is blocked, Q2 is cut off, a voltage substantially more negative than that of the power supply voltage PS–2 is presented to the potentiometer P2 of the Setting Control charging circuit. Diode D1 is now reversed biased, and the emitter-base junction of transistor Q3 is forwardly biased, permitting a charging current to flow from capacitor C3 in the Timer and Charge Control. The magnitude of this charging current is determined by the resistance of load resistor R7a, potentiometer P2, and the small voltage drop across transistor Q3 in the Setting Control. Thus, the charging current can be arbitrarily set by potentiometer P2. The constant nature of the charging rate is brought about by the relative lack of dependence of collector current on collector voltage for a given emitter current of the transistor Q3.

When light again falls on the photoconductive cells PCa, transistor Q2a is again saturated, and transistor Q3 is cut off, so that the charging of capacitor C3 stops and, since capacitor C3 has no low impedance discharge path, it will retain its charge for some time. The events just described represent the conditions illustrated by lines 20, 20c, etc., in FIG. 3.

As previously indicated, the output pulses of the Schmitt trigger STb are of inverse polarity with respect to the output pulses of trigger STa, when the light beams to the respective photocells are blocked and restored. The resetting or discharging circuit differs only from the setting or charging circuit in that transistor Q4 in the Resetting Control RC is a PNP type, its base is held at a considerably more positive voltage than is the base of transistor Q3 in the Setting Control. Also the diode D2 in the Resetting Control is reversed with respect to diode D1 in the Setting Control. Light normally falls on cells PCb of the photosensor Pb, and, because of the configuration of Db, transistor Q2b is cut off, and when cells PCb are illuminated, the input terminal of discharge potentiometer P3 in the Resetting Control is at approximately the potential of the power supply line. Thus with Pb illuminated, current flows through diode D2 to PS-3 in the Resetting Control, and the voltage drop across the diode prevents excessive reverse-bias of the emitter-base junction of the transistor Q4 in the Resetting Control. Thus the transistor Q4 is normally cut off.

When the light to photocells PCb in the photosensor Pb is blocked, transistor Q2b forming part of the Schmitt trigger STb, is switched on, and connects the potentiometer P3 in the Resetting Control, via the relatively small bias resistor R6b in the Schmitt trigger STb to ground. A current determined by the setting of potentiometer P3 now flows through the collector-emitter junction of transistor Q4 in the Resetting Control, and the capacitor C3 in the Timer and Charge Control unit. Discharge of capacitor C3 continues until the collector voltage of transistor Q4 approximates the base voltage, which voltage is set, as previously indicated, a few volts negative. Transistor Q4 in the Resetting Control will then be cutoff, and discharge of condenser C3 is terminated.

Referring particularly to the Timer and Charge Control circuit, a reverse biased Zener diode Z1, and a resistor R8 function as a voltage regulator, which holds the base of transistor Q4 in the Resetting Control at the aforesaid constant voltage.

The emitter of transistor Q5 is held at a more negative potential than the base of Q4 (and therefore the collector of Q4) by the amount of the voltage drop across a diode D3, due to the current through resistor R8. Resistor R9 in the emitter circuit of Q5 is used to make the circuit configuration that of an emitter follower. The base of transistor Q5 is connected through resistor R10, to the ungrounded plate of the timer capacitor C3, and therefore acts as a voltage sensitive switch, remaining cut off whenever its emitter voltage (as set by the Zener diode Z1) approximates its base voltage. Transistor Q5 is conducting whenever the ungrounded plate of capacitor C3 rises above (more positive than) the minimum charge potential.

During charging of C3 by the charging transistor Q3, in the Setting Control, the base-emitter junction of transistor Q5 in the Timer and Charge Control will be reversed biased, and negligible current will flow through the transistor Q5. However, during discharge of capacitor C3 by transistor Q4 in the Resetting Control, transistor Q5 in the Timer and Charge Control will conduct, as soon as the potential across capacitor C3 falls below the minimum charge potential. The discharge linearity is thereby greatly enhanced near the minimum charge potential.

The initiation of current flow through transistor Q5 in the Timer and Charge Control, generates a positive-going pulse through coupling capacitor C4 to amplifier transistor Q6, which inverts the pulse and generates an enlarged negative-going output pulse that is coupled by Zener diode Z2 to the Schmitt trigger input transistor Q1b. Thus, the state of trigger STb is reversed, and transistors Q2b and Q4 are again cut off so that discharge of capacitor C3 ceases. An output pulse 24, 24a, etc. may then be derived from the change in potential across R7b or P3, indicated by lead OP. It will be noted that the amplifier formed by transistor Q6 in the Timer and Charge Control includes a potential divider formed by resistors R11 and R12, which sets the base bias on the base of transistor Q6, and on the collector load resistor R13. The emitter of transistor Q6 is biased by a resistor R14 and capacitor C5.

The power supply circuit shown in FIGURE 4 is generally conventional, using a fullwave rectifier bridge B, that derives A.C. power from the usual transformer PT, and supplies D.C. to the various voltage regulating circuits. A filter capacitor C6 is employed for initial smoothing. Power supply PS-1 for the detectors Da and Db is obtained from a simple regulating circuit consisting of a line resistor R15 and a reverse biased Zener diode Z3. The regulated voltage of power supply PS-2 for the Setting and Resetting Controls circuit utilizing a load resistor R16, series connected diodes D4 and D5 and a Zener diode Z4. The latter regulating circuit is also used to obtain a regulated base voltage for a voltage regulator transistor Q7 which, by means of the emitter resistor R17, generates the requisite precisely regulated voltage for the power supply line PS-3, for the Schmitt triggers and Timer and Charge Control.

The following is a list of typical circuit components which may be used in the circuit diagram shown in FIGURE 4:

| | |
|---|---|
| Ra | 15K. |
| R1b | 27K. |
| R2a and b | 33K. |
| R3a and b | 18K. |
| RXa and b | 27K. |
| R5a and b | 27K. |
| R6a | 560 ohm. |
| R6b | 430 ohm. |
| R7a and b | 22K. |
| R8 | 18K. |
| R9 | 10K. |
| R10 | 47K. |
| R11 | 10K. |
| R12 | 33K. |
| R13 | 18K. |
| R14 | 1000 ohm. |
| R15 | 18K. |
| R16 | 500 ohm. |
| R17 | 250 ohm. |
| P1a and b | 100K. |
| P2, 3 | 5K. |
| D1, D2, D3, D4, D5 | 1N457. |
| Z1 | 1N1509. |
| Z2 | 1N1511A (8 v.). |
| Z3 | 1N1526 (18 v.). |
| C1a, b | 39 mfd. |
| C2a, b | 270 mmfd. |

| | |
|---|---|
| C3 | 12 mfd. |
| C4 | 47 mfd. |
| C5 | 100 mfd. |
| C6 | 1000 mfd. (50 v.). Mallory HC 5010A. |
| C7 | 47 mfd. |
| Q1a, Q6 | 2N396A. |
| Q1b, Q2a and b | |
| Q4 | 2N327A. |
| Q3, Q5 | 2N169A. |
| PCa and b | CL403ASC. |
| PT | Triad F40 x 24 v. C.T. at 1.0 amp. |
| PS-1 | −18 v. |
| PS-2 | −18 v. |
| PS-3 | −19 v. |
| Minimum charge potential | −5.6 v. (approx.). |

The operation of the circuit illustrated in FIGURE 4 will now be briefly reviewed as follows. A parcel (X1, say, as shown in FIGURES 1–3) proceeds along secondary conveyor S toward the light beam from La to Pb, which illuminates the photocells PCa. The timing capacitor C3 will have been charged by transistor Q5 in the Timer and Charge Control to the minimum charge potential, this minimum charge being maintained for as long as the circuit is in operation. When the light beam from La to the photocells PCa is broken, a pulse PaX1 (point 1 in FIGS. 2 and 3) is transmitted to the Schmitt trigger STa and effects the switching off of transistor Q2a, so that the potentiometer P2 in the Setting Control SC is connected to a potential approximately equal to that of the power supply line PS-3. A charging current now flows through potentiometer P2 and transistor Q3 in the Setting Control. The charging of capacitor C3 is indicated by line 20, FIG. 3.

When the timer capacitor C3 in the Timer and Charge Control is slightly more than half charged (point 2 in FIGS. 2 and 3), the light beam from Lb to photocells PCb is broken by the parcel X1, and a pulse PbX1 is transmitted to Schmitt trigger STb, causing transistor Q4 in the Resetting Control to conduct so as to allow a discharge current for the timing capacitor C3 to flow through P3 and Q4. Since the Resetting Control potentiometer P3 is set at approximately half the resistance of the Setting Control potentiometer P2, the discharge current for capacitor C3 is discharged at the same rate as it was initially charged. This is represented by line 22, FIG. 3.

As soon as the light from La is restored to photocells PCa (point 3, FIG 3), charging current ceases to flow to the timing capacitor C3 and, for a short while, capacitor C3 will discharge at twice the initial charging rate. This period is represented by the short line 22a, FIG. 3. However, as soon as the capacitor voltage reaches the minimum charge potential (the base line of the charging curve in FIG. 3, and point 4 in that figure), transistor Q5 in the Timer and Charge Control generates an output pulse which is amplified by transistor Q6 and presented to the Schmitt trigger STb to effect the switching off of transistor Q2b in the Schmitt trigger. Thus, the discharging of the timing capacitor C3 is stopped, and an output pulse 24 (FIG. 3) may be obtained from across the collector load resistor R7b of transistor Q2b in the Schmitt trigger STb, and transformed by coupling capacitor C7 into a short positive-going pulse (pulse 24, FIG. 3) to indicate the location of the center of parcel X1.

A similar procedure will be followed for parcel X2, except that the restoration of light to photocells PCa (point 7, FIG. 3) occurs before the light to photocells PCb is blocked, which will effect the termination of the charging of the storage capacitor C3 before the discharge current commences. The countdown begins when parcel X occludes Lb (point 8, FIG. 3). Again, an output pulse will be generated when the storage capacitor voltage reaches the minimum charge potential, and an output pulse (24a, FIG. 3 and point 9) will be generated at the instant that the center of parcel X2 is opposite light Lb and photosensor Pb.

While a particular form of the present invention has been shown and described, it will be understood that the center locators described are capable of considerable modification and variation without departing from the principle of the invention, and that the scope of the invention should be limited only by the scope and proper interpretation of the claims appended hereto.

I claim:

1. A method of locating the center of an article supported by a conveyor which moves at a substantially constant speed, said method comprising the steps of: sensing the passage of the article past a first fixed point on said conveyor; continuously adjusting the delay period of an adjustable delay timer at a rate such that, at any given time while said article is passing said point, the delay period is proportional to the length of the article which has passed that point at that time; sensing the passage of the article past a second fixed point on said conveyor spaced downstream from the first point; causing the delay timer to time out the delay period set thereon at twice the aforesaid rate while the article is passing said second point; and generating a signal when the delay timer returns to its original state to indicate that the center of the article is positioned opposite said second point.

2. A method of locating the center of an article moving at a substantially constant speed past an upstream and a downstream point adjacent its path of movement, said method comprising the steps of: sensing the passage of the article past the upstream point; modifying the charge on a timer capacitor at a substantially constant rate and in one direction while the article is passing said upstream point so that the respective change in capacitor potential at any time is proportional to the length of the article which has passed said upstream point; sensing the passage of the article past the downstream point; modifying the charge on the capacitor in the opposite direction at a rate substantially double the aforesaid rate while the article is passing said downstream point and at least until the capacitor potential has returned to its original level; and generating a signal when the capacitor potential returns to its original level to indicate that the center of the article is opposite said downstream point.

3. A method of insuring that articles are precisely diverted from a conveyor moving at substantially constant speed by means of one or more pusher blade diverters operated in a predetermined manner by a diverter control means, said method comprising the steps of: maintaining the charge on a timer capacitor at a predetermined and constant minimum level, sensing the passage of each article past a first point fixed relative of said conveyor, continuously charging the timer capacitor at a substantially constant rate while an article passes said upstream point so that the increase in capacitor potential at any time is proportional to the length of the article which has passed said upstream point; sensing the passage of the article past a second point spaced downstream from the first point by a distance not more than the minimum spacing between the articles carried by said conveyor and not less than half the length of the longest article; discharging the capacitor at a rate substantially double the aforesaid charging rate while the article is passing said second point and at least until the capacitor potential has returned to its original minimum level; generating a signal for ultimate transmission to the diverter control means when the capacitor potential returns to its minimum level to indicate that the center of the article is positioned opposite the second point.

4. A method of ensuring that articles are precisely diverted from a conveyor moving at substantially constant speed by means of one or more pusher blade diverters operated in a predetermined manner by a diverter control means, said method comprising the steps of: sensing the passage of each article past a first point filed relative to said conveyor, continuously adjusting the delay period of an adjustable delay timer at a rate such that, at any given time while an article is passing said point, the delay period is proportional to the length of the article which has passed that point at that time; sensing the passage of each article past a second fixed point on said conveyor spaced downstream from the first point by a distance not more than the minimum spacing between articles on said conveyor and not less than half the maximum parcel length; causing the delay timer to time out the delay period set thereon at twice the aforesaid rate while an article is passing said second point and until the timer has returned to its original state; and generating a signal for eventual control of the diverter control means when the delay timer returns to its original state to indicate that the center of an article is positioned opposite said second point.

5. A method of indicating when a predetermined portion of an article moving at a constant speed has passed a given point along its path, the ratio of the length of that portion of the article which is past said point to the length of the whole article being as 1 is to X, said method comprising the steps of: sensing the passage of the article past a first fixed point on said conveyor; continuously adjusting the delay period of an adjustable delay timer at a rate such that, at any given time while said article is passing said point, the delay period is proportional to the length of the article which has passed that point at that time; sensing the passage of the article past a second fixed point on said conveyor spaced downstream from the first point; causing the delay timer to time out the delay period set thereon at a rate X times the aforesaid rate while the article is passing said second point and until the timer is returned to its original state; and generating a signal when the delay timer returns to its original state to indicate that the predetermined proportion of the article has passed said second point.

6. Apparatus for locating the center of an article supported by a conveyor moving at substantially constant speed, said apparatus comprising: a first article sensing device arranged adjacent the conveyor and adapted to sense the passage of an article therepast; a second article sensing device arranged adjacent the conveyor, spaced downstream from said first device, and adapted to sense the passage of an article therepast; a variable delay timer capable of being set at one rate upon receipt of a setting signal and reset at another rate upon the receipt of a resetting signal; a setting control having an input connected to the first article sensing device and an output connected to said timer so that the timer is set at a predetermined rate while the first sensing device senses an article passing thereby; a resetting control having an input connected to the second sensing device and an output connected to said timer so that the timer is reset at a rate twice the setting rate while the second sensing device senses an article passing thereby; and signal generating means for generating a signal when the variable timer is reset to its original condition to indicate that the center of the article is opposite said second article sensing device.

7. Apparatus for locating the center of an article moving at substantially constant speed along a predetermined path, said apparatus comprising: a first article sensing device arranged to sense the passage of an article past a first point and to provide an output signal while said article is passing said first point; a second article sensing device arranged to sense the passage of an article past a second point and to provide an output signal while said article is passing said second point; a timer setting control receiving the output of the first article sensing device and arranged to generate a setting signal while an article is passing the first point; a timer resetting control receiving the output of the first article sensing device and arranged to generate a setting signal while an article is passing the first point; a timer resetting control receiving the output of the second article sensing device and arranged to generate a resetting signal while at least the first half of an article is passing the second point; and a timer for receiving the setting and resetting signals from the setting and resetting controls respectively, said timer being advanced at a predetermined rate from its normal state by the setting signal, said timer being restored at twice said rate by the resetting signal, and means for providing an output signal when the timer is restored to its normal state to indicate that the center of the parcel is opposite the second point.

8. In a conveyor system the combination of: a constant speed article carrying conveyor, a remotely controllable article diverter located adjacent said conveyor for deflecting selected articles from the conveyor, article sensing means located adjacent said conveyor upstream from said diverter and including a first article sensor and a second article sensor spaced downstream from the first sensor by a distance not more than the minimum article spacing and not less than half the length of the longest article, a variable delay timer connected to said sensors, a timer setting control connected between the timer and the first sensor for continuously setting the timer at a given rate while an article is being sensed by said first sensor, a timer resetting control connected between the timer and the second sensor for continuously resetting the timer at twice said given rate as soon as the article is sensed by said second sensor and until the timer is fully reset, and signal generating means connected between the timer and the diverter control means for generating a signal when the timer is completely reset for ultimate transmission to the diverter.

9. Apparatus for locating the center of an article supported by conveyor moving at substantially constant speed, said apparatus comprising: a first article sensing device arranged adjacent the conveyor and adapted to sense the passage of an article therepast, a second article sensing device arranged adjacent the conveyor, spaced downstream from said first device and adapted to sense the passage of an article therepast, a timer, a timing capacitor included in said timer, a setting control having an input connected to the first article sensing device and an output connected to said timer and arranged to charge said timer capacitor at a predetermined rate while the first sensing device senses an article passing thereby, a resetting control having an input connected to the second sensing device and an output connected to the timer and arranged to discharge said timer capacitor at a rate twice the charging rate while the second sensing device senses an article passing thereby, and signal generating means for generating a signal when the timer capacitor is restored to its original charge to indicate that the center of the article is opposite said second article sensing device.

10. Apparatus for indicating when a predetermined proportion of an article moving at a constant speed has passed a given point along its path, the ratio of the length of that portion of the article which is past said point to the length of the whole article being as 1 is to X, said apparatus comprising: a first article sensing device arranged adjacent the conveyor and adapted to sense the passage of an article past a first point, said first sensing device being spaced upstream from said given point by a distance greater than the length of said article portion and less than the minimum spacing between the articles on said conveyor, a second article sensing device arranged adjacent the conveyor and adapted to sense the passage of an article past said given point, a variable delay timer capable of being set at one rate upon receipt of a setting signal and reset at another rate upon the receipt of a resetting signal, a setting control having an input connected to the first article sensing device and an output connected to said timer so that the timer is set at a predetermined rate while the first sensing device senses an article passing by said first point, a resetting control having an input connected to the second sensing device and an output connected to said timer so that the timer is reset at a rate X times the setting rate while the second sensing device senses an article passing by said given point, and signal generating means for generating a signal when the variable delay timer is reset to its original condition to indicate that the predetermined portion of the article has passed said given point.

11. Apparatus for locating the center of an article moving at substantially constant speed along a predetermined path, said apparatus comprising: a first article sensing device arranged to sense the passage of an article past a first point adjacent said path and to provide an electrical output signal while said article is passing said first point; a second article sensing device arranged to sense the passage of an article past a second point adjacent said path and to provide an electrical output signal while said article is passing said second point, the second point being spaced downstream from the first point by a distance not less than half the maximum article length and not greater than the minimum spacing between articles; an electronic timer, a timing capacitor within said timer, a minimum charge control circuit connected to the timer to insure that the charge on the timer capacitor does not fall substantially below a predetermined minimum level; a timer setting control circuit receiving the output of the first article sensing device and arranged to charge said timing capacitor at a given constant rate while an article is passing the first point and the electrical signal is received from the first article sensing device; a timer resetting control circuit receiving the output of the second article sensing device and arranged to discharge said timing capacitor at twice said given constant rate while the electrical signal is received from the second article sensing device and until the charge on said capacitor is reduced to the minimum charge level; and a voltage sensitive output signal generating device connected to the timer and arranged to generate an output signal when the charge on the capacitor returns to its minimum charge level and thereby to indicate that the center of the article is positioned opposite the second point adjacent said article path.

12. Apparatus for locating the center of an article moving at substantially constant speed along a predetermined path, said apparatus comprising: a first article sensing device arranged to sense the passage of an article past a first point adjacent said path and to provide an electrical output signal of given polarity while said article is passing said first point; a second article sensing device arranged to sense the passage of an article past a second point adjacent said path and to provide an electrical output signal of reverse plurality while said article is passing said second point, the second point being spaced downstream from the first point by a distance not less than half the maximum article length and not more than the minimum spacing between articles; an electronic timer, a timer capacitor within said timer, a minimum charge control circuit connected to the time to insure that the charge on the timer capacitor does not fall below a predetermined level; a timer setting control comprising a charging transistor arranged with its base connected to a source of substantially constant potential, its collector connected to the timer capacitor and its emitter connected via a charging resistor to receive the output signals from said first article sensing device; and an electronic timer resetting control comprising a discharging transistor arranged with its base connected to a source of substantially constant potential, its collector connected to the timer capacity and its emitter connected via a discharging resistor to receive the output signals from the second article sensing device, the resistance of the discharging resistor being substantially half that of the charging resistor; and an output signal generating circuit connected to said nimimum charge control circuit and arranged to generate an output signal when the minimum charge control circuit operates to charge the timer capacitor.

13. Apparatus for locating the center of an article moving at substantially constant speed along a predetermined path, said apparatus comprising: a timing capacitor; a charging transistor having its collector connected to said capacitor and its base connected to a source of bias potential so that, when a charging potential is applied to its emitter, said timing capacitor is charged at a substantially constant rate; a discharging transistor of reverse polarity type to the charging transistor having its collector connected to said capacitor and its base connected to a source of bias potential so that, when a discharging potential of reverse polarity to the charging potential is applied to its emitter, said timing capacitor is discharged at a substantially constant rate; a minimum charge transistor having its base connected to the timing capacitor and having a substantially constant forward biasing potential applied across its collector-emitter junction so that, when the capacitor charge potential falls below a predetermined minimum level, a base current flows in said minimum charge transistor to recharge the capacitor to said minimum level, an output signal being derived from the emitter-collector circuit of said minimum charge transistor during said base current flow to indicate that the capacitor charge was temporarily below said minimum level; a first article sensing device arranged to sense the passage of an article past a first point adjacent said path and to generate said charging potential while the article is passing the first point; a second article sensing device arranged to sense the passage of an article past a second point adjacent said path and to generate said discharging potential while the article is passing the second point, the second point being spaced downstream from the first point by a distance not less than half the maximum article length and not greater than the minimum spacing between articles; a charging impedance connecting said first article sensing device to the emitter of the charging transistor so that the generation of said charging potential effects the charging of said capacitor; a discharging impedance connecting the second article sensing device to the emitter of the discharging transistor so that, when a discharging potential is generated, the timing capacitor is discharged at twice the charging rate.

14. Apparatus for locating the center of an article moving at substantially constant speed along a predetermined path, said apparatus comprising: an electronic timer, a timing capacitor within said timer, a minimum charge control circuit connected to the timer to ensure that the charge on the timer capacitor does not fall substantially below a predetermined level; a timer setting control circuit connected to the timer capacitor and arranged to charge said capacitor at a substantially constant rate upon the application of a charging potential to said circuit; a timer resetting control circuit also connected to the timer capacitor and arranged to discharge said capacitor at a substantially constant rate upon the application of a discharging potential to said circuit, the discharger rate being substantially double the charge rate; a first photoelectric sensor arranged to sense the passage of an article past a first point and adjacent said path; a first bistable electronic trigger circuit connected to said sensor and arranged so that, when the light to the first photoelectric sensor is blocked by the passage of an article therepast, a charging potential is applied to an output terminal of said trigger circuit, and when the light to the photoelectric sensor is restored, the charging potential is removed from said terminal, said terminal being connected to the timer setting control circuit so that the charging potential is applied thereto; a second photoelectric sensor arranged to sense the passage of an article past a second point adjacent said path, the second point being spaced downstream from the first point by a distance not less than half the maximum article length and not greater than the minimum spacing between articles; a second bistable electronic trigger circuit connected to said second sensor and arranged so that, when the light to the second photoelectric sensor is blocked by the passage of an article therepast, a discharging potential is applied to an output terminal of said second trigger circuit, and when the light to the second photoelectric sensor is restored, the discharging potential is removed from said terminal, said terminal being connected to the timer resetting control circuit so that the discharging potential is applied thereto; and a voltage sensitive output signal generating device connected to the timer and connected to the second bistable electronic trigger circuit, said voltage sensitive device being arranged to generate an output signal when the charge on the capacitor returns to its minimum charge level so as to reverse the state of said second trigger circuit, discontinue the discharge of the capacitor, and generate an output signal to indicate that the center of the article is positioned opposite the second point adjacent said article path.

15. Apparatus for locating the center of an article moving in substantially constant speed along a predetermined path, said apparatus comprising: a timing capacitor; a charging transistor having its collector connected to said capacitor and its base connected to a source of bias potential so that, when a charging potential is applied to its emitter, said timing capacitor is charged at a substantially constant rate; a discharging transistor of reverse polarity type to the charging transistor having its collector connected to said capacitor and its base connected to a source of bias potential so that, when a discharging potential of reverse polarity to the charging potential is applied to its emitter, said timing capacitor is discharged at a substantially constant rate; a minimum charge transistor having its base connected to the timing capacitor and a substantially constant forward biasing potential applied across its collector-emitter junction so that, when the capacitor charge potential falls below a predetermined minimum level, a base current flows to recharge the capacitor to said minimum level, and output signal being derived from the emitter-collector circuit of said minimum charge transistor during said base current flow to indicate that the capacitor charge is temporarily below said minimum level; a first photoelectric sensor arranged to sense the passage of an article past a first point adjacent said path; a first bistable electronic trigger circuit connected between said first photoelectric sensor and the emitter of the charging transistor and arranged so that, when the light to the first photoelectric sensor is blocked by the passage of an article therepast, a charging potential is applied to the emitter of the charging transistor, and when the light to the photoelectric sensor is restored, the charging potential is removed from the emitter of the charging transistor; a second photoelectric sensor arranged to sense the passage of an article past a second point adjacent said path and spaced downstream from the first point by a distance not less than half the maximum article length and not more than the minimum spacing between articles; a second bistable electronic trigger circuit connected between said second photoelectric sensor and the emitter of the discharging transistor and arranged so that, when the light to the second photoelectric sensor is blocked by the passage of an article therepast, a discharging potential is applied to the emitter of the discharging transistor, and when the light to the second photoelectric sensor is restored, said discharge potential removed from the emitter of the discharge transistor; a first rheostat connected between the first bistable electronic trigger circuit and the emitter of the charging transistor; a second rheostat connected between the second bistable electronic trigger circuit and the emitter of the discharge transistor, said rheostats being adjusted so that the impedance of the first is substantially twice that of the second and so that the timing capacitor charging rate is twice the discharging rate; and an electrical connection formed between the second bistable electronic trigger circuit and the minimum charge circuit such that said output signal of the minimum charge circuit is applied to the second bistable electronic trigger circuit to effect the switching of said circuit when the charge on said timing capacitor falls to the minimum charge level, the switching of said second trigger circuit thereby terminating the discharge of the timing capacitor and generating an output pulse signal to indicate that the center of an article is located opposite the second photoelectric sensor.

16. A method of locating the center of an article moving at substantially constant speed along a given path, said method comprising the steps of: sensing the passage of the entire length of an article past a first point along the path, setting a timer at a given countup rate while the article is passing said first point so that when the article has passed said point, the timer will have received a countup signal proportional to the time taken for the entire length of the article to pass said first point; sensing the arrival of the article at a second point downstream of the first point by a distance exceeding half the length of the article, re-setting the timer while the article is passing the second point at a countdown rate which is twice the countup rate until the timer is restored to zero, and generating a signal at the termination of countdown to indicate that the center of said article is opposite the second point.

References Cited by the Examiner

UNITED STATES PATENTS

| | | | |
|---|---|---|---|
| 2,640,152 | 5/1953 | Hartwig | 250—223 X |
| 2,855,089 | 10/1958 | Griffin | 198—21 |
| 2,987,162 | 6/1961 | Griffin | 198—21 |
| 3,033,366 | 5/1962 | Atanasoff | 209—82 |
| 3,096,871 | 7/1963 | Anderson. | |

MARVIN A. CHAMPION, *Primary Examiner.*